April 1, 1952 E. HOERNER 2,591,432
DRAIN
Filed Aug. 15, 1949

INVENTOR.
ERIC HOERNER
BY
John D. McLeran
HIS ATTORNEY

Patented Apr. 1, 1952

2,591,432

UNITED STATES PATENT OFFICE 2,591,432

DRAIN

Eric Hoerner, Dayton, Ohio

Application August 15, 1949, Serial No. 110,377

9 Claims. (Cl. 230—1)

This invention relates to improvements in drains and has for its object to provide a compact, efficient and easily installed moisture eliminator. It is also an object of this invention to provide a precision built, automatic drain that will keep all compressor tanks, air line traps and automotive air brake systems in a drained condition.

It is also an object of this invention to provide a drain which will operate automatically on the compressor head pressure build up when the compressor starts and the head pressure relief when the compressor stops. This drain will automatically keep the compressor tank and air lines, if installed on traps, free of moisture at all times. This is true on both single and two stage compressors. On automotive installations this automatic drain is operated by the pressure build up and pressure relief in the brake application line when the brakes are applied and released. These and other advantages will appear from the following description taken in connection with the drawings in which:

Figure 1:
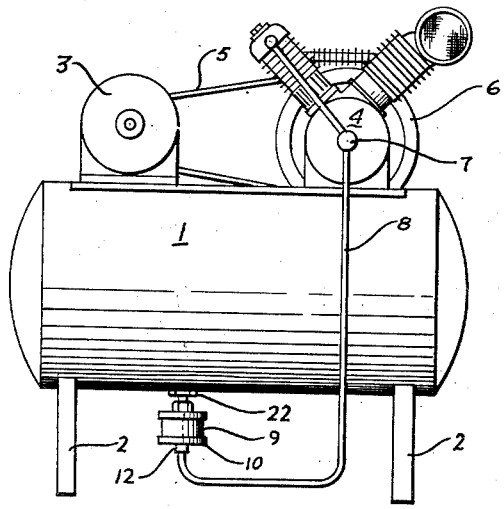
Fig. 1 is a side elevation of a tank to which applicant's drain is attached.
Figure 5:
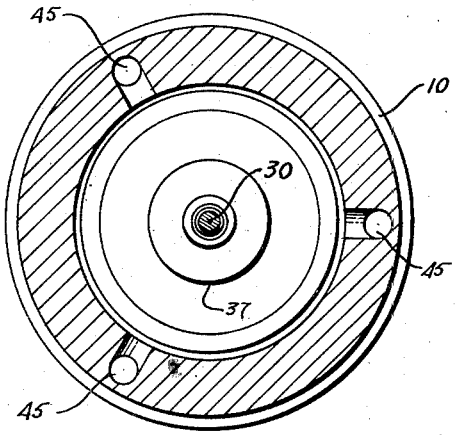
Fig. 5 is a section on line 5—5 of Fig. 2.

Applicant presents in this application one exemplification of his drain. Referring to Fig. 1, the numeral 1 is used to designate a tank which is mounted upon legs 2. On top of the tank is a motor 3 which operates a compressor 4 by means of a belt 5 and a pulley 6. The numeral 7 is used to designate an unloader mechanism which has intermittent pressure build up and release. From this unloader mechanism there extends an operating tube 8 connected at one end in any suitable manner to said mechanism and at its other end to the drain. This drain may be mounted as shown in Fig. 1 to the bottom of the tank and is composed essentially of a housing having an annular member 9 and plates 10 and 15. The plate 10 is attached to the member 9 by means of screws 11. Extending downwardly from the plate 10 is a circular projection 12 which has a threaded hole 13 therein for receiving any standard connection into which tube 8 is fitted. Resting upon the plate 10 is a circular diaphragm composed of some non-soluble rubber-like material 14. The edge of this diaphragm is clamped between the annular member 9 and the plate 10.

Figure 2:
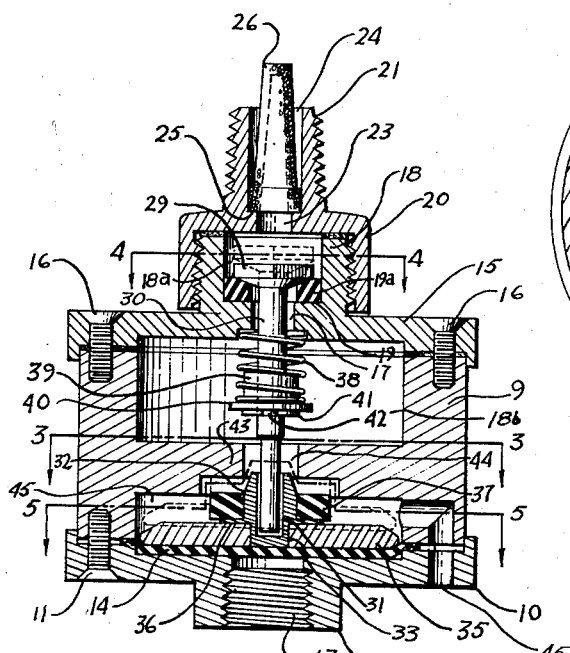
Fig. 2 is a vertical section through the drain.
Figure 3:
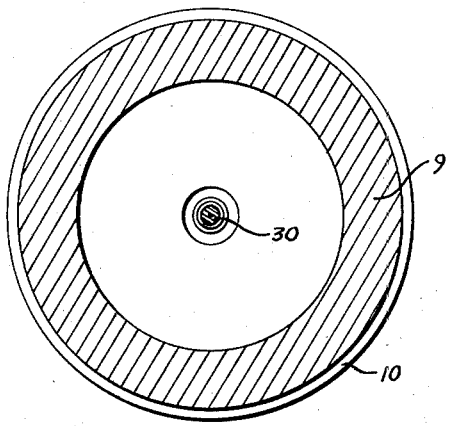
Fig. 3 is a section on line 3—3 of Fig. 2.
Figure 4:
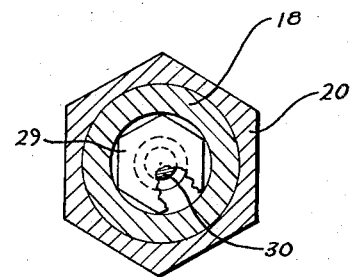
Fig. 4 is a section on line 4—4 of Fig. 2.

Attached to the annular member 9 opposite the plate 10 is the plate 15 secured to the annular member by means of screw 16. In the center of the plate 15 is a hole 17 which leads from a chamber 18b formed by the annular member 9 and the plate 15 into a chamber 18a formed by an annular projection 18 extending upwardly from plate 15. This annular projection 18 forms around the hole 17 and with plate 15 a seat 19 for a washer 19a. This washer is made of any suitable non-soluble material. Fitting over the annular projection 18 and threaded thereto is a cap 20 which has extended upwardly therefrom a hollow threaded projection 21 forming a male fitting that fits into a female fitting 22 on the under side of the tank or any other place where there is a tank outlet. Extending through the annular projection 21 is a passage way formed of two parts 23 and 24 of different sizes so that there is provided in the passage way 24 a shoulder which forms a seat 25 for a hollow cone-shaped filter 26 made of any suitable material, preferably porous ceramic or powdered metal material. On the plate 15 around the hole 17 is a washer 19a which provides with the hole 17 a passageway into a chamber 18a in the projection 18. This passage way through the hole 17 may be closed by means of a head 29 hexagonal in shape as shown by Fig. 4. Extending downwardly from the head 29 and through the hole 17 is a stem 30. The lower end of this stem is slightly reduced in size to fit loosely in a hole 31 in a sleeve 32. This sleeve is reduced at its lower end and fits in a hole 33 provided therefor in a disc 35. The sleeve has thereon a flange 36 which rests upon the upper surface of the disc 35. Resting upon the flange 36 and around the sleeve above the disc 35 is a washer 37 which is adapted to close a passage way leading from the chamber 18b down to a cavity above the plate 10 and the disc 35. Mounted around the stem 30 is a spring 38 which at one end fits into a seat provided therefor in the plate 15. In the other end of this spring is a sleeve 39 which has thereon a flange-like shoulder 40 against which the other end of the spring engages. The shoulder fits against a washer 41 located in a groove 42 around the stem. In the interior of the annular member is an annular projection 43 which has therein a hole 44 for the passage of water, fluid, air from one chamber to another. The passage way formed by the annular projection 43 provides a communication from the chamber 18b in which the spring is located and another chamber 45 in which the diaphragm and the plate are located. Extending from the lower part of the housing is an outlet passage way 45 through which water accumulated may pass when the valve is open which closes the passage way through the opening in the partition.

What I claim is:

1. In a drain in combination with a tank having a compressor and an unloader mechanism thereon, and a connection between the unloader mechanism and the tank, said connection including a housing having a chamber connected to the tank, a second chamber having an exhaust outlet and pressure operated means operated by the unloader mechanism to regulate the passage of water from the first named chamber to the exhaust outlet.

2. In a drain, a tank, a housing having a plurality of chambers, one chamber having an inlet connection to the tank, another chamber having outlets, a valve mechanism having two positions and adapted in one position to close the inlet and open the outlets and in another position to open the inlet and close the outlets and an unloader mechanism on the tank connected to the housing to operate the valve mechanism.

3. In a drain, a housing formed of an annular member and a pair of plates, said housing having therein a partition dividing the housing into two chambers, said partition having an opening connecting the chamber, one plate having therein an inlet passage way, the other plate having a hole therein, a diaphragm clamped between the annular member and one of the plates, said diaphragm being on said hole, a valve mechanism operatively connected to the diaphragm normally closing the inlet passage way and holding the opening connecting the chambers open and means to supply pressure to the diaphragm through the hole to shift the valve mechanism whereby the partition opening is closed and the inlet passage way is opened.

4. In a drain, a housing formed of an annular member and a pair of plates, said housing having therein a partition dividing the housing into two chambers, said partition having an opening connecting the chambers, one plate having therein an inlet passage way, the other plate having a hole therein, a diaphragm clamped between the annular member and one of the plates, said diaphragm being over said hole, a valve mechanism operatively connected to the diaphragm, means acting on the valve mechanism to close the inlet passage way and hold open the opening connecting the chambers and means to supply pressure to the diaphragm through the hole to shift the valve mechanism whereby the partition opening is closed and the inlet passage way is opened.

5. In a drain, a housing formed of an annular member and a pair of plates, said housing having therein a partition dividing the housing into two chambers, said partition having an opening connecting the chambers, one plate having therein an inlet passage way, the other plate having a hole therein, a diaphragm clamped between the annular member and one of the plates, said diaphragm being over said hole, a valve mechanism operatively connected to the diaphragm, spring acting on the valve mechanism to close the inlet passage way and hold open the opening connecting the chambers and means to supply pressure to the diaphragm through the hole to shift the valve mechanism whereby the partition opening is closed and the inlet passage way is opened.

6. In a drain, a tank, a compressor having thereon an unloader mechanism, a housing formed of an annular member and a pair of plates, said housing having therein a partition dividing the housing into two chambers, said partition having an opening connecting the chambers, one plate having therein an inlet passage way from the tank, the other plate having therein a hole, a diaphragm clamped between the annular member and one of the plates, said diaphragm being over said hole, a valve mechanism operatively connected to the diaphragm, means acting on the valve mechanism to close the inlet passage way and hold open the opening connecting the chambers and means connecting the unloader mechanism to the hole whereby pressure is applied to the diaphragm to shift the valve mechanism whereby the partition opening is closed and the inlet passage way opened.

7. In a drain, a tank, a compressor having thereon an unloader mechanism, a housing formed of an annular member and a pair of plates, said housing having therein a partition dividing the housing into two chambers, said partition having an opening connecting the chambers, one plate having therein an inlet passage way from the tank, the other plate having therein a hole, a diaphragm clamped between the annular member and one of the plates, said diaphragm being over said hole, a valve mechanism operatively connected to the diaphragm, means acting on the valve mechanism to close the inlet passage way and hold open the opening connecting the chambers and a tube connecting the unloader mechanism to the hole whereby pressure is applied to the diaphragm to shift the valve mechanism whereby the partition opening is closed and the inlet passage way opened.

8. In a drain, in combination with a tank having an outlet, a housing having thereon a projection having therein a passageway, said projection fitting in the outlet, and a coned-shaped filter in said passageway, said filter substantially filling the passageway at one end.

9. In a drain, in combination with a tank having an outlet, a housing having thereon a projection having therein a passageway, said projection fitting in the outlet, and a coned-shaped filter in said passageway, said filter being formed of powdered metal and substantially filling one end of said passageway.

ERIC HOERNER.

REFERENCES CITED

The following references are of record in the file of this patent:

UNITED STATES PATENTS

| Number | Name | Date |
|---|---|---|
| 2,128,206 | Hewitt | Aug. 23, 1938 |
| 2,256,565 | Mantle | Sept. 23, 1941 |
| 2,301,034 | Freeman et al. | Nov. 3, 1942 |
| 2,462,614 | De Witt | Feb. 22, 1949 |